Oct. 23, 1956 O. L. BRAUN 2,767,731
WATER COOLED VALVE AND LIFTING STEM
Filed Feb. 11, 1955 2 Sheets-Sheet 2
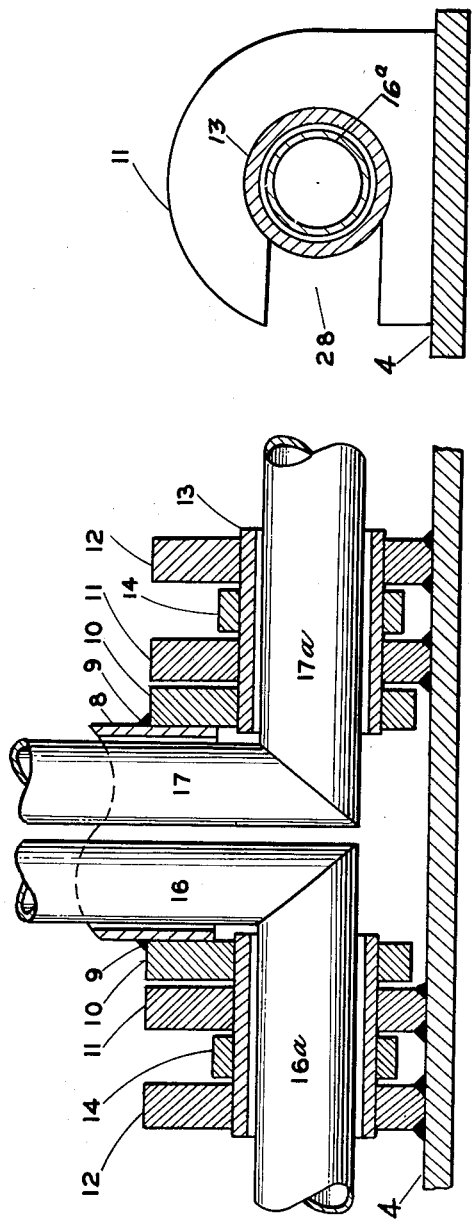
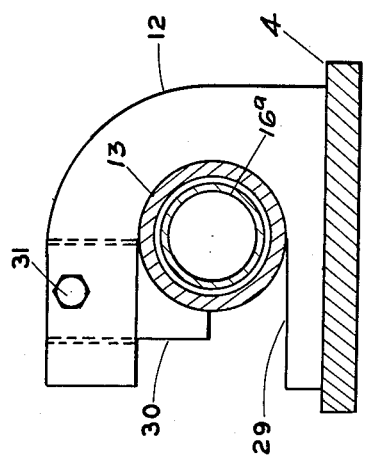
INVENTOR.
Ottwin L. Braun
BY
Christy, Parmelee & Strickland.
ATTORNEYS.

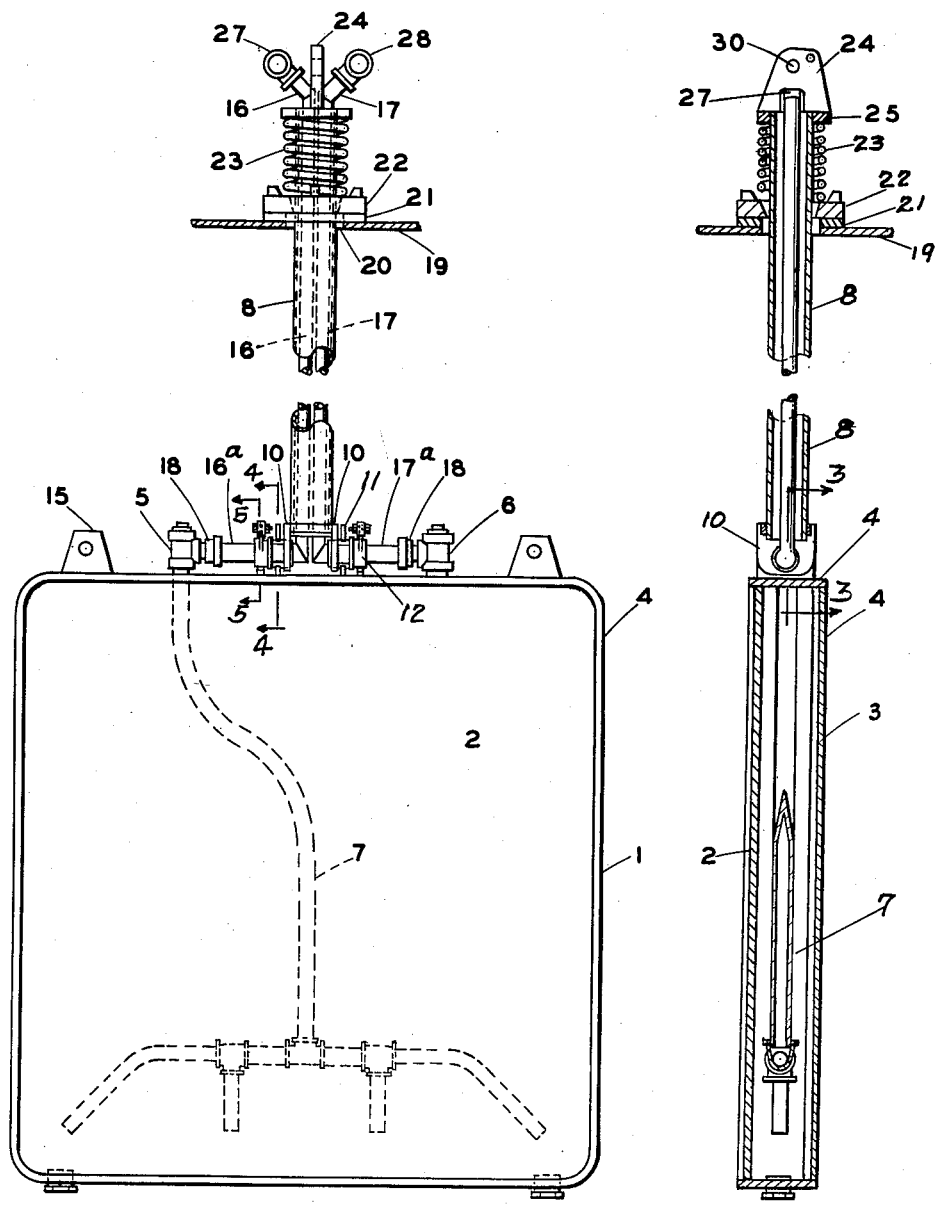

United States Patent Office 2,767,731
Patented Oct. 23, 1956

2,767,731

WATER COOLED VALVE AND LIFTING STEM

Ottwin L. Braun, Pittsburgh, Pa., assignor to Reliance Steel Products Company, McKeesport, Pa., a corporation of Pennsylvania Application February 11, 1955, Serial No. 487,660

3 Claims. (Cl. 137—340)

This invention pertains to water cooled valves such as reversing valves, stack and waste heat boiler valves. More specifically it is directed to a new and novel assembly of the valve lifting stem with the valve body.

One object of the invention is to provide a flexible connection between the lifting stem and the valve which is independent of the water inlet and outlet lines extending across the top of the valve.

This and other objects will be apparent to those skilled in the art from the specification and the drawing forming a part thereof in which Fig. 1 shows a front elevation of the valve body and stem; Fig. 2 shows a section through the valve and stem at the center line; Figs. 3, 4 and 5 show details of construction taken on line III—IIII, IV—IV and V—V of Fig. 1.

Referring now in detail to the drawings the valve body 1 may be of any suitable construction such as the spaced plates 2 and 3 connected by a peripheral plate 4 to provide an enclosed hollow chamber through which the cooling water flows. At the top of the valve body 1 and extending through the member 4 on opposite sides of the valve center line are the water inlet 5 and outlet 6 which may be pipe T's. A suitably branched inlet pipe 7 carries the incoming cold water to adjacent the bottom of the valve. A valve lifting stem comprising pipe 8 extends upwardly from the valve at the center line thereof. At opposite sides of pipe 8 and secured thereto, as by welding 9, are lifting lugs 10 disposed in a direction transversely to the valve 1 and spaced above the valve member 4. Adjacent each lug 10 is a lifting lug 11 disposed substantially parallel to lug 10 and secured to valve member 4 as by welding. Adjacent each valve lifting lug 11, in spaced relation thereto, are the lifting lugs 12 disposed substantially parallel to the lugs 10 and 11, and secured to valve member 4 as by welding. Each of the lugs 10, 11 and 12 at each side of the pipe 8 have registering openings through which a sleeve 13 extends. Preferably the sleeve has a sliding fit in said openings, the length of each sleeve 13 being substantially equal to the overall assembled width of its respective lugs 10, 11 and 12. The opening through lug 11 to receive sleeve 13, as shown in Fig. 4, preferably connects with an opening 28 extending inwardly from one side of the lug 11. This opening 28 is of a width less than the outside diameter of the sleeve 13 and greater than that of the water pipe within the sleeve. The opening through lug 12 to receive sleeve 13, as shown in Fig. 5, preferably connects with an opening 29 extending inwardly from one side of the lug 12. This opening 29 is of a width not less than the outside diameter of sleeve 13. To retain sleeve 13 within lug 12 a plate 30 fastened by member 31 at one side of the opening 29 and extends partly across the opening 29. Between spaced lugs 11 and 12 is a set collar 14 having a suitable opening for reception of sleeve 13 and provided with a suitable set screw for engaging the sleeve 13 to retain the latter in position within said openings of the members 10, 11 and 12.

Adjacent opposite sides of the valve 1 are handling lugs 15 for a purpose hereinafter described.

Within the pipe 8 are vertically extending water inlet pipe 16 and outlet pipe 17. These pipes have angularly extending portions 16a and 17a disposed within each adjacent sleeve 13 and terminating adjacent their respective inlet and outlet fittings 5 and 6 on valve body 1. The pipes 16a and 17a preferably have a loose fit within sleeves 13. A suitable flexible coupling 18 known as a male adapter connects each pipe 16a and 17a to its respective fitting 5 and 6. The upper end of pipe 8 extends through a suitable cover plate 19 which is designed for each particular installation of the valve and forms a part of the structure within which the valve is mounted. The opening 20 in the cover plate 19 through which pipe 8 extends is sufficiently larger than pipe 8 to permit the pipe to freely move within the opening 20. Mounted on pipe 8 so as to engage the upper face of cover plate 19 when the valve 1 is in its lowermost position is a bearing plate 21, spring seat 22 and coil spring 23. The pipe 8 terminates in a lifting head 24 secured thereto and having a bottom flange 25 for selective engagement with spring 23. The opening 30 in head 24 provides for attachment of a wire rope extending over suitable sheaves to an operating machine which raises and lowers the valve. The lifting head 24 has a suitable opening 27 therein through which the water pipes 16 and 17 extend and terminate in suitable water inlet and outlet fittings 27 and 28 respectively. These latter fittings are suitably connected by flexible tubing (not shown) to a source of water supply and drain.

The valve stem assembly as herein described provides a unique linkage between the water cooled damper valve 1 and the customary wire rope fastened through opening 30 in lifting head 24. The enlarged opening 20 in cover plate 19, bearing plate 21 and tapered opening in spring plate 22 permit limited movement of valve and valve stem so that the valve will always lay against its inclined seat (not shown) when in any position between fully opened and totally closed positions in the event of misalignment of the wire rope sheave above the damper valve. This connection between valve stem and valve is independent of the water inlet and outlet pipes 16a and 17a horizontally above the damper valve 1. There is never any load on these pipes 16a and 17a which might distort them or loosen their connection with the valve. Furthermore the herein described distribution of the weight of the valve upon the valve stem 8 eliminates all danger of the water pipes 16a and 17a collapsing under weight of the valve due to corrosion of these pipes and causing a shut down of the furnace until replaced.

To assemble the valve 1 with lifting stem 8, the valve with lugs 11 and 12 thereon is suspended by the lifting lugs 15 in any suitable manner. Lifting stem 8 having lugs 10 welded thereto and water pipes 16 and 17 mounted therein with extensions 16a and 17a projecting through openings in lugs 10, is moved toward valve 1. Sleeves 13 fitting loosely over pipes 16a and 17a have set collars 14 mounted thereon. The lugs 12 mounted on valve 1 have the holder plates 30 thereon removed. The lifting stem assembly is moved into engagement with valve 1 by passing sleeves 13 through openings 29 in valve lugs 12 and passing lugs 10 of valve stem 8 between valve lugs 11 and 12. Sleeves 13 are then passed through the openings in lugs 10 and 11 and the set collars 14 fastened to the sleeves 13. Holding plates 30 on valve lug 12 are then fastened in place of bolts 31. The male adapters 18 then connect pipes 16a and 17a to the adjacent water inlet 5 and outlet 6. The suspension means may now be released from valve lifting lugs 15 and the valve will be suspended from stem 8 solely by lugs 10, 11, 12 and sleeves 13 engaged therewith.

To disassemble lifting stem 8 from valve 1, the weight valve body 1 is again suspended by suitable means engaging lifting lugs 15. Holding plates 30 are removed from valve lugs 12, set collars 14 are loosened and sleeves 13 slid outwardly until free of valve lugs 11. The adapters 18 are released from their respective valve fittings 5 and 6 and the lifting stem assembly swung outwardly free of the valve body 1.

The preferred form of construction is shown herein. It is to be understood, however, that the exact details of construction are for purposes of illustration and not limitation, except as made necessary by the scope of the appended claims.

I claim:

1. In a water-cooled valve, in combination, a closed hollow valve body, spaced water inlet and outlet connections on said valve body communicating with the interior of the body, a valve stem containing inlet and outlet water conduits, each said conduit projecting from said stem to the respective water connections on said valve body, lugs mounted on said stem at each side theerof, lugs mounted on said valve body in spaced relation on each side of said stem lugs, registering openings in said lugs, a hollow sleeve member mounted in said registering lug openings at opposite sides of the stem connecting the stem and valve body so that the weight of the valve body is carried by the valve stem through said lugs and the sleeves mounted therein, said water conduits extending through said sleeves from the valve stem to the respective valve body fitting, and separable connections between each conduit and respective valve body fitting.

2. The combination as in claim 1 wherein one of said valve body lugs at each side of the valve stem has an opening therein smaller than said sleeve extending substantially normal to the sleeve therein and connecting with the lug opening receiving said sleeve to pass the conduit disposed within the sleeve, the other of the valve body lugs at the same side of the valve stem has an opening therein slightly larger than said sleeve extending substantially normal to the lug sleeve opening and connecting therewith, and removable means on said latter lug for retaining the sleeve therein.

3. The combination as in claim 1 wherein, a set collar is mounted in each sleeve between the pair of lugs mounted on the valve body at each side of the stem to retain the sleeve in valve body supporting position within the lugs during use of the valve.

No references cited.